Patented Feb. 8, 1927.

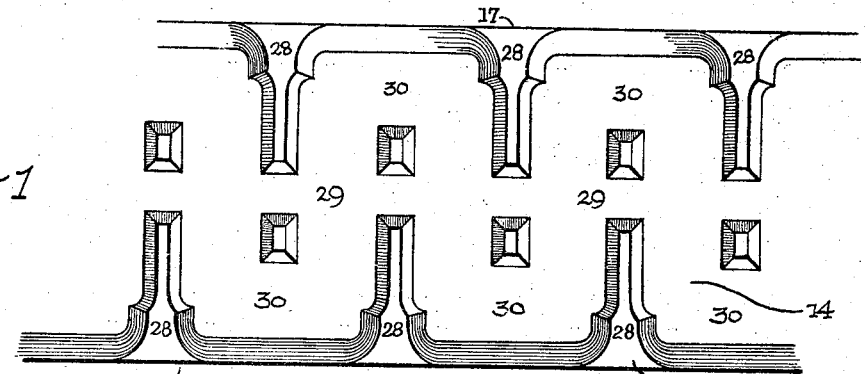
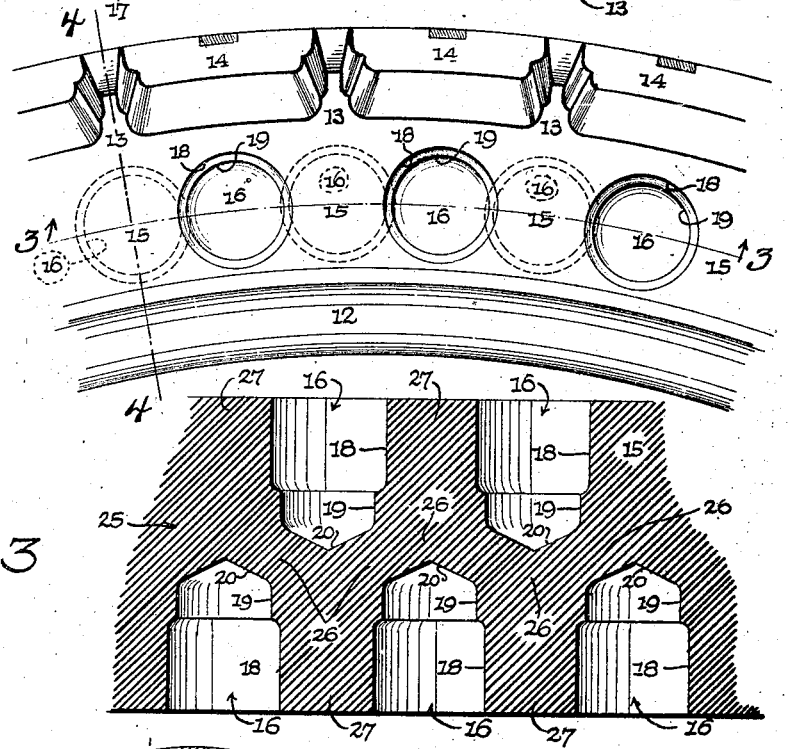
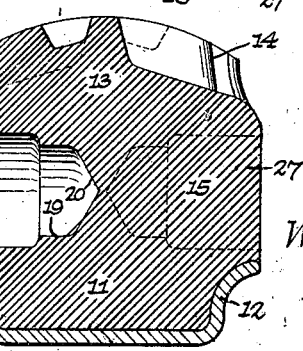

1,616,843

UNITED STATES PATENT OFFICE.

WILLIAM A. BRUBAKER, OF AKRON, OHIO.

CUSHION TIRE.

Application filed July 29, 1924. Serial No. 728,891.

My invention relates to cushion tires and the principal object is to provide a new and improved tire of this type. In the drawings accompanying this specification and forming a part thereof I have shown, for purposes of illustration, one form of which my invention may assume. In these drawings:

Figure 1 is a tread view of a section of a tire embodying this illustrative form of my invention, Figure 2 is a side elevation of the tire shown in Figure 1.

Figure 3 is a section on the line 3—3 of Figure 2, while

Figure 4 is a section on the line 4—4 of Figure 2.

The tire herein shown comprises a base region 11 fixed to a rim 12 of any suitable construction, a tread region 13 carrying a tread 14, and an intermediate region 15 disposed between the base region 11 and the tread region 13 effective to firmly connect the base region 11 and the tread region 13. The intermediate region 15 is so formed, and the intermediate region 15 and tread 14 are so correlated, that the tire not only absorbs readily the blows and impacts imposed upon it and thus prevents the transmission of these blows and impacts to the vehicle but also prevents the accumulation of wave action in the intermediate region 15 and the consequent destruction of the intermediate region 15 and at the same time presents at all points about the periphery a substantially uniform capacity for the absorption of blows and impacts and consequently eliminates the jar and vibration present in the tires now in use.

In the present embodiment of my invention I provide in the intermediate region 15 a plurality of recesses 16 arranged in two sets each extending inwardly from one of the two lateral faces 17 of the intermediate region 15 and in this particular embodiment of my invention the recesses 16 of each set are disposed in staggered relation to the recesses 16 of the other set and each recess 16 of either set comprises a round portion 18 of larger diameter extending from the exterior of the tire substantially half-way to the median plane of the tire and a round portion 19 of lesser diameter disposed concentrically with respect to the portion 18 of larger diameter, extending from the portion 18 of larger diameter to substantially the median plane of the tire, and terminating in a substantially conical tip 20. In the embodiment of my invention herein shown, the recesses 16 are so placed that the abutments 27 between adjacent recesses 16 are of a width less than the diameter of the larger portion 18 and greater than the diameter of the smaller portion 19.

This formation of these recesses 16 causes the intermediate region 15 to consist of a web 25 itself consisting of a peripherally extending sinuous rib 26 flanked on each side by a series of laterally extending fins 27 arranged in staggered relation and each of a width less than the height thereof and less than the diameter of the larger diameter portion 18 of each recess 16.

In the present embodiment of my invention the recesses 28 in the tread 14 are formed substantially directly above the fins 27 between the recesses 16 whereby the tread consists of a narrow central rib 29 flanked on each side by a plurality of blocks 30 each overlying one of the recesses 16, of an extent peripherally of the tire greater than that of the recess 16, and, together with the rib 29, of an extent across the tire greater than that of the recess 16.

With the above construction the sinuosity of the web 26 and the spaced relation of the fins 27 prevent wave formation in the intermediate region 15, and the continuity of the ribs 26 and 30 causes the weight of the vehicle to be always carried partly on rubber, the dimensions and positioning of the various parts of the web 25 and the various parts of the tread 14 produce a tire which will yield readily, this same proportioning and positioning of the web 25 and correlation of the web 25 and tread 14 produces a tire in which the weight of the vehicle is at no point carried entirely by rubber, the construction of the web 25 and tread 14 and the correlation of the web 25 and tread 14 are such that at every point about the periphery of the tire the weight of the vehicle is carried partly by rubber under compression and partly by rubber which is without direct support and in tension, and the arrangement and dimensions of the parts of the web 25 and of the parts of the tread 14 and the correlation between the parts of the web 25 and the parts of the tread 14 are such that the resistance of the tire to compression is substantially the same at all points about the periphery of the tire.

It will be understood by those skilled in the art that the particular construction herein shown and described may be variously changed and modified without sacrificing the advantages of my invention or departing from the spirit thereof and it will therefore be understood that the disclosure herein is illustrative only and that my invention is not limited thereto.

I claim:

1. A cushion tire provided on each lateral face with a circumferentially extending series of inwardly extending recesses arranged in staggered relation to the recesses on the other lateral face of said tire and each comprising a part of substantially constant larger diameter extending from the exterior of the tire substantially half-way to the median plane of the tire and of not less diameter than the width of each intervening abutment and a part of substantially constant reduced diameter continuing to substantially the median plane of said tire and of not greater diameter than the width of each intervening abutment.

2. A cushion tire provided on each lateral face with a circumferentially extending series of inwardly extending recesses arranged in staggered relation to the recesses on the other lateral face of said tire and each comprising a part of substantially constant larger diameter extending from the exterior of the tire substantially half-way to the median plane of the tire and of not less diameter than the width of each intervening abutment and a part of substantially constant reduced diameter continuing to substantially the median plane of said tire.

3. A cushion tire provided on each lateral face with a circumferentially extending series of inwardly extending recesses arranged in staggered relation to the recesses on the other lateral face of said tire and each comprising a part of substantially constant larger diameter extending from the exterior of the tire substantially half-way to the median plane of the tire and a part of substantially constant reduced diameter continuing to substantially the median plane of said tire and of not greater diameter than the width of each intervening abutment.

In testimony whereof, I hereunto affix my signature.

WILLIAM A. BRUBAKER.